(12) United States Patent
Huang et al.

(10) Patent No.: US 11,524,867 B2
(45) Date of Patent: Dec. 13, 2022

(54) DETERMINATION OF NON-NORMAL ELEVATOR CALLING REQUEST IN AN AUTOMATIC ELEVATOR CALLING REQUEST SYSTEM

(71) Applicant: Otis Elevator Company, Farmington, CT (US)

(72) Inventors: Wenbo Huang, Shanghai (CN); Xiaofei Guo, Shanghai (CN); Haiyan Xue, Shanghai (CN); Renxiang Chen, Shanghai (CN); Heping Qiu, Shanghai (CN); Lieping Wei, Shanghai (CN); Tan Liu, Shanghai (CN); Jingyu Tong, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1021 days.

(21) Appl. No.: 16/233,916

(22) Filed: Dec. 27, 2018

(65) Prior Publication Data

US 2019/0193989 A1    Jun. 27, 2019

(30) Foreign Application Priority Data

Dec. 27, 2017    (CN) .......................... 201711441593.5

(51) Int. Cl.
*B66B 1/16*    (2006.01)
*B66B 1/46*    (2006.01)
(Continued)

(52) U.S. Cl.
CPC ................ *B66B 1/468* (2013.01); *B66B 1/28* (2013.01); *H04W 4/33* (2018.02); *B66B 2201/4653* (2013.01); *B66B 2201/4684* (2013.01)

(58) Field of Classification Search
CPC ... B66B 1/468; B66B 1/28; B66B 2201/4653; B66B 2201/4684; B66B 1/3461;
(Continued)

(56) References Cited

U.S. PATENT DOCUMENTS 3,519,102 A    7/1970    Saving
5,952,626 A    9/1999    Zaharia
(Continued)

FOREIGN PATENT DOCUMENTS

CN    1865112 A    11/2006
CN    101955093 A    1/2011
(Continued)

OTHER PUBLICATIONS

European Search Report for application EP 18215145.6, dated Sep. 23, 2019, 9 pages.
(Continued)

*Primary Examiner* — Mahendra R Patel
(74) *Attorney, Agent, or Firm* — Cantor Colburn LLP

(57) ABSTRACT

An automatic elevator call system includes: a wireless signal apparatus installed in an elevator landing zone of an elevator system and broadcasting a corresponding wireless signal around; a counting unit configured to count, after an elevator call request corresponding to an identity of the personal mobile terminal is sent or received, the number of times the elevator call request corresponding to the identity is made within a predetermined time period; and an abnormal elevator call request judgment unit configured to judge, based on a comparison result between the number of times the elevator call request is made and a predetermined threshold, whether the elevator call request corresponding to the identity is a normal elevator call request operation. The present
(Continued)

invention can effectively determine an intentional or unintentional abnormal elevator call request operation of a passenger.

29 Claims, 6 Drawing Sheets

(51) Int. Cl.
    *B66B 1/28*            (2006.01)
    *H04W 4/33*          (2018.01)

(58) Field of Classification Search
    CPC ............ B66B 1/46; H04W 4/33; H04W 4/06; H04W 4/16
    USPC ........................................................ 187/381
    See application file for complete search history.

(56) References Cited

U.S. PATENT DOCUMENTS

| | | | | |
|---|---|---|---|---|
| 6,209,685 | B1 * | 4/2001 | Zaharia | B66B 1/468 187/388 |
| 6,397,976 | B1 * | 6/2002 | Hale | B66B 1/2408 187/389 |
| 7,155,317 | B1 * | 12/2006 | Tran | H05B 47/13 700/259 |
| 7,552,800 | B2 * | 6/2009 | Puskala | B66B 1/468 187/392 |
| 8,960,373 | B2 | 2/2015 | De Vincentis | |
| 2010/0315208 | A1 | 12/2010 | Takeuchi | |
| 2015/0068849 | A1 * | 3/2015 | Haipus | B66B 1/468 187/384 |
| 2016/0311647 | A1 * | 10/2016 | Peterson | B66B 5/0012 |
| 2017/0197807 | A1 * | 7/2017 | Noda | H04N 7/185 |
| 2017/0260023 | A1 * | 9/2017 | Zhang | B66B 3/002 |
| 2017/0305715 | A1 * | 10/2017 | Tang | G06F 3/0346 |
| 2019/0100405 | A1 | 4/2019 | Scoville et al. | |

FOREIGN PATENT DOCUMENTS

| | | | | |
|---|---|---|---|---|
| CN | 104477714 | | 4/2015 | |
| CN | 104760851 A | | 7/2015 | |
| CN | 104760851 B | | 9/2016 | |
| CN | 106946108 A | | 7/2017 | |
| CN | 107074484 A | | 8/2017 | |
| CN | 105829223 B | * | 9/2019 | ........... B66B 1/3461 |
| EP | 1731470 A1 | * | 12/2006 | ............... B66B 5/18 |
| EP | 2855319 B1 | | 4/2015 | |
| FR | 2980869 A1 | * | 4/2013 | ........... G06K 9/3233 |
| JP | H04338079 A | | 11/1992 | |
| WO | 0164571 A1 | | 9/2001 | |
| WO | 2017112659 A1 | | 6/2017 | |
| WO | 2017175019 A1 | | 10/2017 | |

OTHER PUBLICATIONS

Chinese Office Action for Application No. 201810635326.X; dated Oct. 19, 2021; 16 Pages.
European Search Report for Application No. 18215145.6; dated Dec. 15, 2020; 4 Pages.
Kwon, Ohhoon, et al., "Sensor-aware elevator scheduling for smart building environments", abstract, vol. 72, Feb. 2014, 2 pages.

* cited by examiner

DETERMINATION OF NON-NORMAL ELEVATOR CALLING REQUEST IN AN AUTOMATIC ELEVATOR CALLING REQUEST SYSTEM

This application claims priority to Chinese Patent Application No. 201711441593.5, filed Dec. 27, 2017, and all the benefits accruing therefrom under 35 U.S.C. § 119, the contents of which in its entirety are herein incorporated by reference.

TECHNICAL FIELD

The present invention belongs to the field of intelligent elevator control technologies, and relates to the determination of an abnormal elevator call request.

BACKGROUND ART

In an existing elevator system, the elevator system can obtain an elevator call request command that reflects a real elevator-riding service requirement of a passenger. An elevator call request operation (no matter whether it is completed automatically or manually) corresponding to the elevator call request command is a normal elevator call request operation. If the passenger performs an abnormal elevator call request operation that cannot reflect the real elevator-riding service requirement of the passenger, the efficiency of the elevator system will be affected. In particular, if an abnormal elevator call request operation is input repeatedly in a short time period, the efficiency of the elevator system will be affected greatly. For example, in a serious circumstance, the car door of an elevator car stopping at the landing cannot be closed normally.

SUMMARY OF THE INVENTION

According to a first aspect of the present invention, an automatic elevator call system is provided, including: a wireless signal apparatus installed in an elevator landing zone of an elevator system and broadcasting a corresponding wireless signal around; wherein the automatic elevator call system detects the wireless signal through a personal mobile terminal, and is capable of sending an elevator call request to the wireless signal apparatus automatically; and the automatic elevator call system further includes: a counting unit configured to count, after an elevator call request corresponding to an identity of the personal mobile terminal is sent or received, the number of times the elevator call request corresponding to the identity is made within a predetermined time period; and an abnormal elevator call request judgment unit configured to judge, based on a comparison result between the number of times the elevator call request is made and a predetermined threshold, whether the elevator call request corresponding to the identity is a normal elevator call request operation.

According to an embodiment of the present invention, in the automatic elevator call system, the abnormal elevator call request judgment unit is further configured to determine the elevator call request corresponding to the identity as an abnormal elevator call request operation when the number of times the elevator call request is made is greater than or equal to the predetermined threshold, and to determine the elevator call request corresponding to the identity as a normal elevator call request operation when the number of times the elevator call request is made is less than the predetermined threshold.

According to an embodiment of the present invention, in the automatic elevator call system, the predetermined time period is 30 seconds to 1 minute.

According to an embodiment of the present invention, in the automatic elevator call system, the predetermined threshold is greater than or equal to 3 times and less than or equal to 10 times.

According to an embodiment of the present invention, in the automatic elevator call system, the counting unit and the abnormal elevator call request judgment unit are disposed in the personal mobile terminal.

According to an embodiment of the present invention, in the automatic elevator call system, the automatic elevator call system further stops, through a sending stop unit in the personal mobile terminal, sending the elevator call request corresponding to the identity when the elevator call request corresponding to the identity is determined as an abnormal elevator call request.

According to an embodiment of the present invention, in the automatic elevator call system, the counting unit and the abnormal elevator call request judgment unit are disposed in the wireless signal apparatus.

According to an embodiment of the present invention, in the automatic elevator call system, the wireless signal apparatus is further provided with a receiving stop unit configured to stop receiving the elevator call request corresponding to the identity when the elevator call request corresponding to the identity is determined as an abnormal elevator call request.

According to an embodiment of the present invention, in the automatic elevator call system, the wireless signal apparatus is further configured to cancel the elevator call request when the elevator call request corresponding to the identity is determined as an abnormal elevator call request.

According to an embodiment of the present invention, in the automatic elevator call system, the automatic elevator call system further sends an elevator call request including a corresponding identity to the wireless signal apparatus automatically through the personal mobile terminal.

According to an embodiment of the present invention, in the automatic elevator call system, the elevator call request can be implemented by a manual operation of a passenger carrying the personal mobile terminal.

According to an embodiment of the present invention, in the automatic elevator call system, the wireless signal apparatus is a Bluetooth module/Bluetooth Low Energy (BLE) module, and the wireless signal is a Bluetooth signal/BLE signal.

According to a second aspect of the present invention, a method for determining an abnormal elevator call request of an automatic elevator call system is provided, including steps of: counting, after an elevator call request corresponding to an identity of a personal mobile terminal is sent or received, the number of times the elevator call request corresponding to the identity is made within a predetermined time period; and judging, based on a comparison result between the number of times the elevator call request is made and a predetermined threshold, whether the elevator call request corresponding to the identity is a normal elevator call request operation.

According to an embodiment of the present invention, in the method, in the judging step, the elevator call request corresponding to the identity is determined as an abnormal elevator call request operation if the number of times the elevator call request is made is greater than or equal to the predetermined threshold, and the elevator call request corresponding to the identity is determined as a normal elevator call request operation if the number of times the elevator call request is made is less than the predetermined threshold.

According to an embodiment of the present invention, in the method, the predetermined time period is 30 seconds to 1 minute.

According to an embodiment of the present invention, in the method, the predetermined threshold is greater than or equal to 3 times and less than or equal to 10 times.

According to an embodiment of the present invention, in the method, the method further includes a step of: stopping sending or receiving the elevator call request corresponding to the identity when the elevator call request corresponding to the identity is determined as an abnormal elevator call request operation.

According to an embodiment of the present invention, in the method, the method further includes a step of: cancelling the elevator call request when the elevator call request corresponding to the identity is determined as an abnormal elevator call request operation.

According to an embodiment of the present invention, in the method, the method further includes a step of: sending an elevator call request including a corresponding identity to the wireless signal apparatus automatically.

According to an embodiment of the present invention, in the method, the wireless signal apparatus is a Bluetooth module/Bluetooth Low Energy (BLE) module, and the wireless signal is a Bluetooth signal/BLE signal.

According to an embodiment of the present invention, in the method, the method further includes steps of: broadcasting a corresponding wireless signal through a wireless signal apparatus installed in an elevator landing zone of an elevator system; and detecting the wireless signal through a personal mobile terminal and sending an elevator call request to the wireless signal apparatus automatically.

According to a third aspect of the present invention, a wireless signal apparatus is provided. The wireless signal apparatus is installed in an elevator landing zone of an elevator system and broadcasts a corresponding wireless signal around, and is capable of receiving, based on the wireless signal, an elevator call request from a personal mobile terminal that detects the wireless signal. The wireless signal apparatus includes: a counting unit configured to count, after an elevator call request corresponding to an identity of a personal mobile terminal is received, the number of times the elevator call request corresponding to the identity is made within a predetermined time period; and an abnormal elevator call request judgment unit configured to judge, based on a comparison result between the number of times the elevator call request is made and a predetermined threshold, whether the elevator call request corresponding to the identity is a normal elevator call request operation.

According to an embodiment of the present invention, in the wireless signal apparatus, the abnormal elevator call request judgment unit is further configured to: determine the elevator call request corresponding to the identity as an abnormal elevator call request operation when the number of times the elevator call request is made is greater than or equal to the predetermined threshold, and to determine the elevator call request corresponding to the identity as a normal elevator call request operation when the number of times the elevator call request is made is less than the predetermined threshold.

According to an embodiment of the present invention, in the wireless signal apparatus, the predetermined time period is 30 seconds to 1 minute.

According to an embodiment of the present invention, in the wireless signal apparatus, the predetermined threshold is greater than or equal to 3 times and less than or equal to 10 times.

According to an embodiment of the present invention, in the wireless signal apparatus, the apparatus further includes: a receiving stop unit configured to stop receiving the elevator call request corresponding to the identity when the elevator call request corresponding to the identity is determined as an abnormal elevator call request.

According to an embodiment of the present invention, in the wireless signal apparatus, the wireless signal apparatus is further configured to cancel the elevator call request when the elevator call request corresponding to the identity is determined as an abnormal elevator call request.

According to an embodiment of the present invention, in the wireless signal apparatus, the wireless signal apparatus is a Bluetooth module/Bluetooth Low Energy (BLE) module, and the wireless signal is a Bluetooth signal/BLE signal.

According to a fourth aspect of the present invention, a wireless signal apparatus is provided, including a memory, a processor, and a computer program that is stored in the memory and can be run on the processor, wherein when executing the program, the processor performs the following steps of: broadcasting a corresponding wireless signal; receiving an elevator call request including an identity; counting, after the elevator call request corresponding to the identity is received, the number of times the elevator call request corresponding to the identity is made within a predetermined time period; and judging, based on a comparison result between the number of times the elevator call request is made and a predetermined threshold, whether the elevator call request corresponding to the identity is a normal elevator call request operation.

According to a fifth aspect of the present invention, a computer readable storage medium storing a computer program is provided, wherein the program is executed by a processor to perform the steps of any of the above-mentioned methods for determining an abnormal elevator call request.

According to a sixth aspect of the present invention, an elevator system is provided, including: any of the above-mentioned automatic elevator call systems; and an elevator controller configured to control running of one or more elevator cars in the elevator system; wherein the elevator controller is coupled to the wireless signal apparatus and controls the running of the one or more elevator cars in the elevator system in response to at least the elevator call request.

According to a seventh aspect of the present invention, a personal mobile terminal is provided. The personal mobile terminal has a corresponding identity and is configured to detect a wireless signal broadcast by a wireless signal apparatus installed in an elevator landing zone of an elevator system and capable of sending an elevator call request to the wireless signal apparatus automatically. The personal mobile terminal includes: a counting unit configured to count, after an elevator call request corresponding to an identity of the personal mobile terminal is sent, the number of times the elevator call request corresponding to the identity is made within a predetermined time period; and an abnormal elevator call request judgment unit configured to judge, based on a comparison result between the number of times the elevator call request is made and a predetermined threshold, whether the elevator call request corresponding to the identity is a normal elevator call request operation.

According to an embodiment of the present invention, in the personal mobile terminal, the abnormal elevator call request judgment unit is further configured to determine the elevator call request corresponding to the identity as an abnormal elevator call request operation when the number of times the elevator call request is made is greater than or equal to the predetermined threshold, and to determine the elevator call request corresponding to the identity as a normal elevator call request operation when the number of times the elevator call request is made is less than the predetermined threshold.

According to an embodiment of the present invention, in the personal mobile terminal, the predetermined time period is 30 seconds to 1 minute.

According to an embodiment of the present invention, in the personal mobile terminal, the predetermined threshold is greater than or equal to 3 times and less than or equal to 10 times.

According to an embodiment of the present invention, in the personal mobile terminal, the personal mobile terminal further includes: a sending stop unit configured to stop sending the elevator call request corresponding to the identity when the elevator call request corresponding to the identity is determined as an abnormal elevator call request.

The foregoing features and operations of the present invention will become more apparent from the following descriptions and accompanying drawings.

BRIEF DESCRIPTION OF THE DRAWINGS

The following detailed description with reference to the accompanying drawings will make the foregoing and other objectives and advantages of the present invention more complete and clearer, wherein identical or similar elements are denoted by using identical reference numerals.

DETAILED DESCRIPTION

The present invention is now described more thoroughly with reference to the accompanying drawings. The drawings show exemplary embodiments of the present invention. However, the present invention can be implemented according to many different forms, and should not be construed as being limited by the embodiments illustrated herein. On the contrary, these embodiments are provided to make the present disclosure thorough and complete, and fully convey the idea of the present invention to those skilled in the art.

Some block diagrams shown in the accompanying drawings are functional entities, which do not necessarily correspond to physically or logically independent entities. The functional entities can be implemented in a software form, or implemented in one or more hardware modules or integrated circuits, or implemented in different processing apparatuses and/or micro control apparatuses.

In the present application, an elevator call request operation represents an operation process of requesting a service of an elevator, and it can be completed automatically or manually by a passenger. A normal elevator call request operation corresponds to a real elevator-riding service requirement of a passenger, and an abnormal elevator call request operation corresponds to an unreal or redundant elevator-riding service requirement of the passenger. For example, if a passenger maliciously performs an elevator call request operation repeatedly, the passenger does not always have a corresponding real elevator-riding service requirement corresponding to each elevator call request operation.

Figure 1:
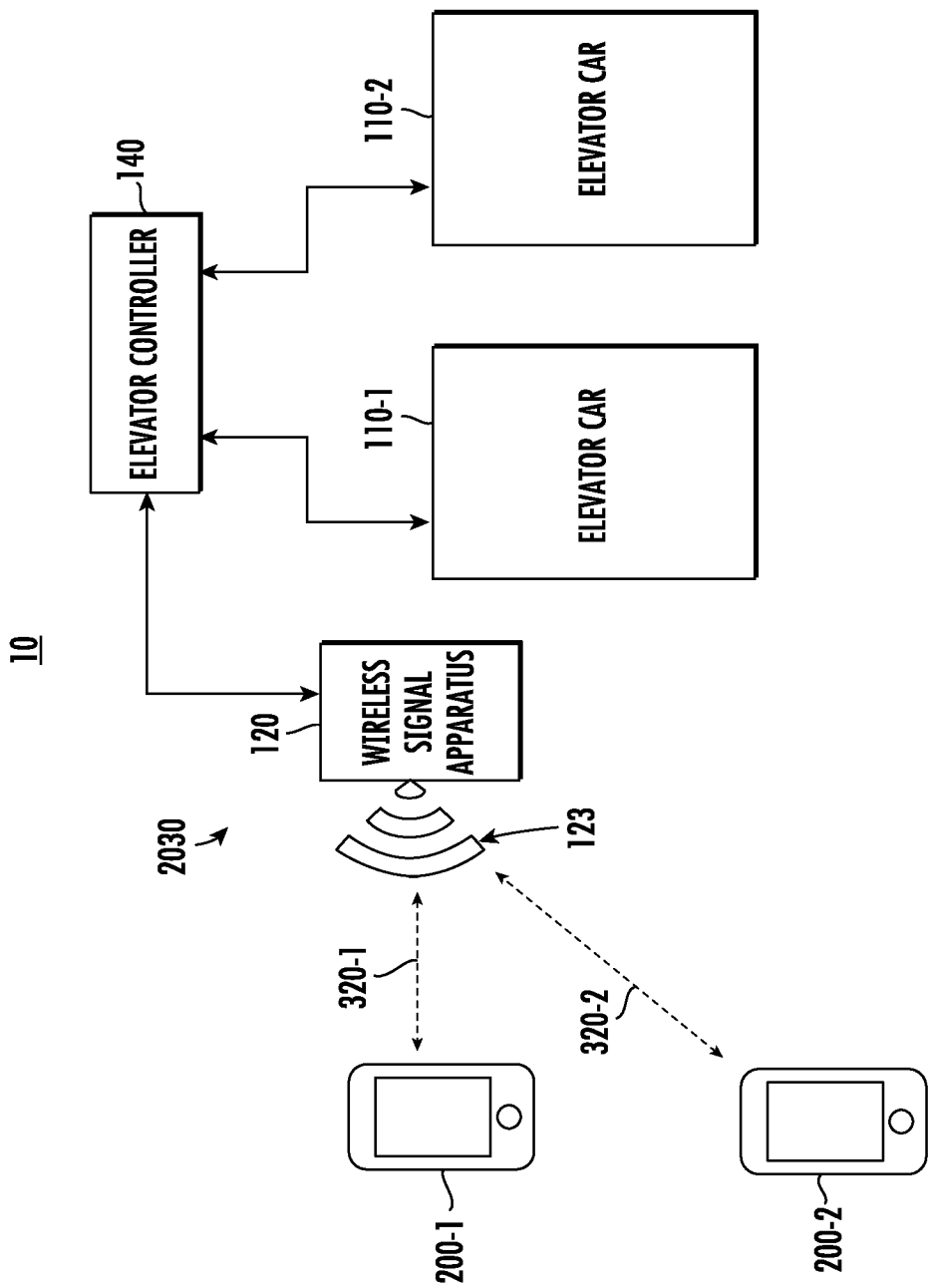
FIG. 1 is a schematic diagram of an elevator system according to an embodiment of the present invention, in which an automatic elevator call system according to an embodiment of the present invention is used.
Figure 2:
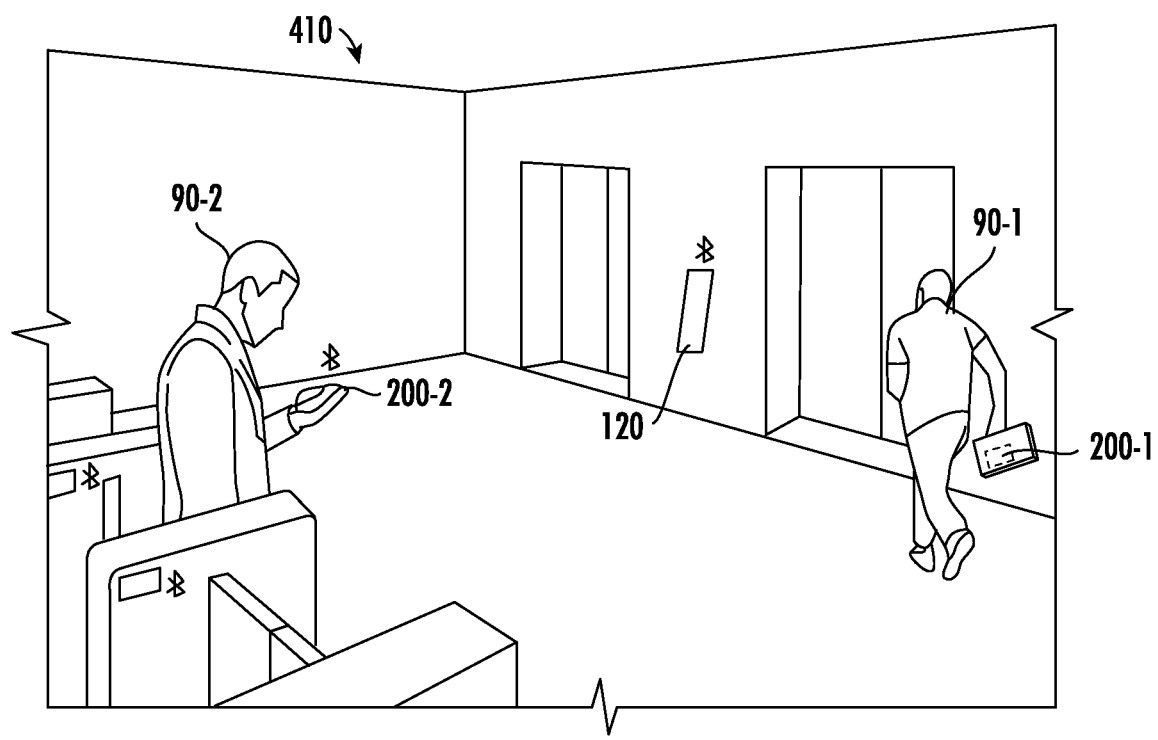
FIG. 2 is a schematic diagram of an application scenario of an elevator system according to an embodiment of the present invention.
Figure 3:
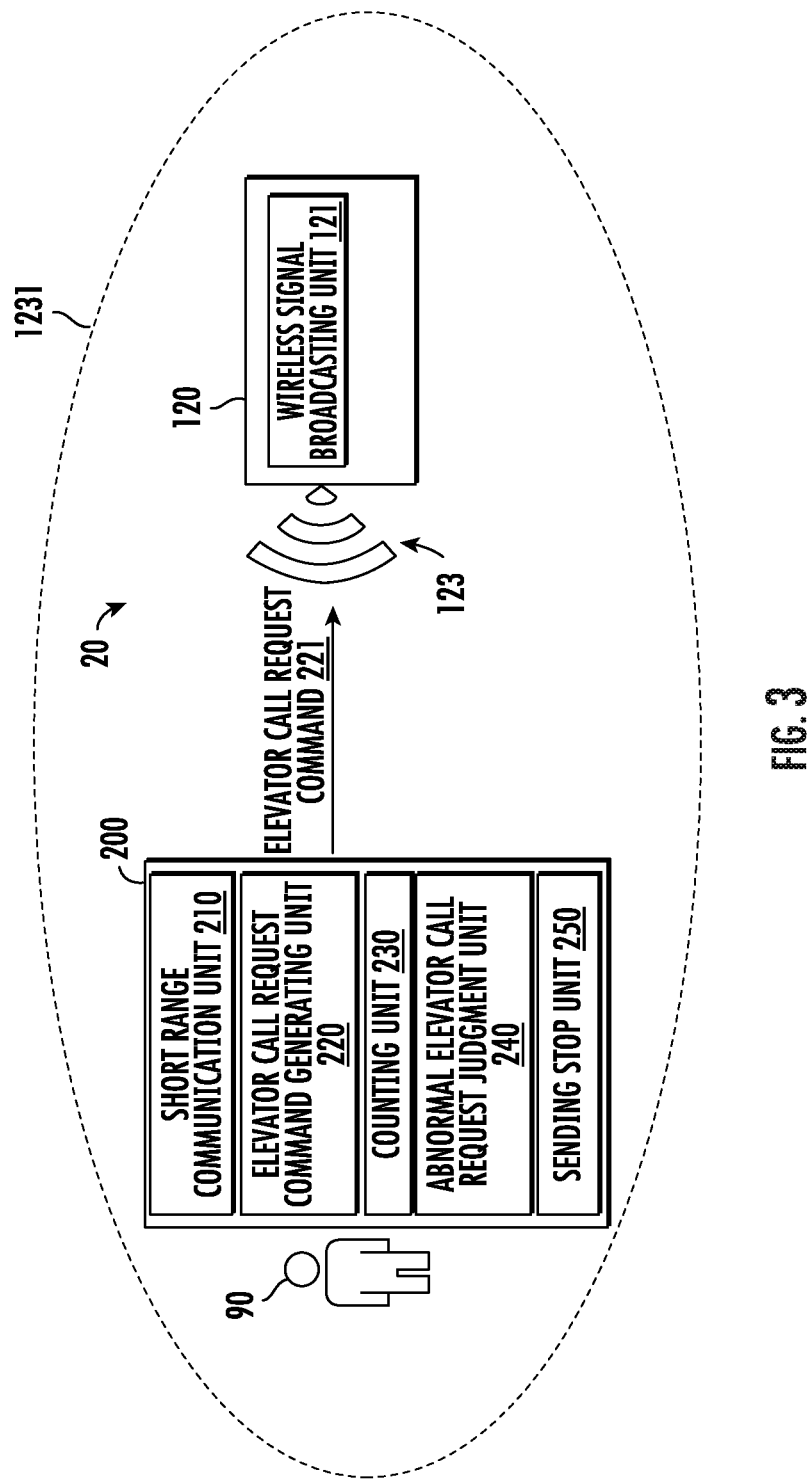
FIG. 3 is a schematic diagram of an automatic elevator call system according to an embodiment of the present invention, in which a wireless signal apparatus according to an embodiment of the present invention is included.

FIG. 1 is a schematic diagram of an elevator system according to an embodiment of the present invention. FIG. 2 is a schematic diagram of an application scenario of an elevator system according to an embodiment of the present invention. FIG. 3 is a schematic diagram of an automatic elevator call system according to an embodiment of the present invention, in which a wireless signal apparatus according to an embodiment of the present invention is included. An elevator system 10, an automatic elevator call system 20, a personal mobile terminal 200, and a wireless signal apparatus 120 according to an embodiment of the present invention are illustrated in detail below with reference to FIG. 1, FIG. 2, and FIG. 3.

The elevator system 10 according to the embodiment of the present invention can be installed in various buildings. The elevator system 10 includes multiple elevator cars 110 that can move vertically in a hoistway of a building. FIG. 1 shows two elevator cars: elevator cars 110-1 and 110-2. Each elevator car 110 is under the control (such as scheduling control and movement control) of an elevator controller 140 in the elevator system 10, so as to move in the hoistway or stop at the corresponding landing. Generally, the elevator controller 140 needs to acquire elevator call request commands from elevator landing zones 410 of various floors, thus controlling running of the elevator based on the commands, for example, performing scheduling control on the elevator cars 110. It will be appreciated that the specific control manner or control principle based on which the elevator controller 140 controls the one or more elevator cars 110 is not limited, and the specific structure, arrangement manner or the like of the elevator controller 140 is not limited either.

In order to acquire the elevator call request command from each elevator landing zone 410, a wireless signal apparatus 120 is disposed in the elevator system 10. The wireless signal apparatus 120 can be, for example, a beacon that can broadcast a wireless signal, and can be installed in each elevator landing zone 410 of the elevator system 10 (as shown in FIG. 2). For example, at least one wireless signal apparatus 120 is installed at each floor or each elevator landing zone 410, so that wireless signals 123 sent out or broadcast by the wireless signal apparatuses 120 can effectively cover each elevator landing zone 410 approximately.

In an embodiment, as shown in FIG. 3, a wireless signal broadcasting unit 121 is disposed in the wireless signal apparatus 120 and is configured to broadcast the wireless signal 123, for example, broadcast a wireless signal of a particular signal strength, so that the wireless signal 123 can cover a predetermined area (i.e., coverage). For example, the coverage is an area in which the personal mobile terminal 200 can detect the wireless signal 123 (such as the coverage where the signal strength is greater than or equal to 0). The coverage can be known in advance by test.

Specifically, the wireless signal apparatus 120 can be integrally disposed in an elevator call request input device of the elevator system 10, wherein the elevator call request input device is generally installed at two sides of a car door of the elevator landing zone 410, and an elevator call button such as "Up" or "Down" can also be further disposed on the elevator call request input device, so that an elevator call request command can be manually input based on the elevator call request input device 12. The specific manner of disposing the wireless signal apparatus 120 with respect to the elevator call request input device is not limited to the above example.

Correspondingly, the wireless signal 123 broadcast by the wireless signal apparatus 120 can be detected by the personal mobile terminal 200. For example, FIG. 1 shows two personal mobile terminals 200-1 and 200-2, which are carried by different passengers 90-1 and 90-2 respectively and can be at least configured to complete an elevator call request operation. The wireless signal apparatus 120 is a main component of the automatic elevator call system 20 in the embodiment of the present invention. Some functions of the automatic elevator call system 20 are implemented by the personal mobile terminal 200. According to an embodiment of the present invention, in the automatic elevator call system 20, when approaching the wireless signal apparatus 120 (for example, walking towards the elevator landing zone 410), different passengers 90-1 and 90-2 will enter the coverage of the wireless signal 123, so that the personal mobile terminals 200 carried by the passengers, which cannot detect the wireless signal 123 at first, can now detect the wireless signal 123. Specifically, as shown in FIG. 3, each personal mobile terminal 200 detects the wireless signal 123 by using a short range communication unit 210 disposed in the personal mobile terminal 200, and can interact (for example, establish a wireless connection) with the wireless signal apparatus 120 based on the wireless signal 123 if necessary. For example, the personal mobile terminal 200-1 implements an interaction 320-1 with the wireless signal apparatus 120, and the personal mobile terminal 200-2 implements an interaction 320-2 with the wireless signal apparatus 120.

The personal mobile terminal 200 can specifically be various intelligent terminals having a Bluetooth connection function, and can be conveniently carried by a passenger. For example, the personal mobile terminal 200 may be a smart phone, a wearable smart device (such as a smart band), a personal digital assistant (PAD), and so on. A corresponding application component (such as APP) can be installed on the personal mobile terminal 200 to implement corresponding functions of the present invention.

In an embodiment, the wireless signal apparatus 120 can be a Bluetooth module, and can specifically be a Bluetooth Low Energy (BLE) module. The wireless signal 123 transmitted or broadcast by the wireless signal broadcasting unit 121 of the wireless signal apparatus 120 is a Bluetooth signal (such as a BLE signal) which can approximately cover the elevator landing zone 410 where it is located. Correspondingly, the short range communication unit 210 of the personal mobile terminal 200 is a Bluetooth communication unit, which can detect a Bluetooth signal, such as a BLE signal.

In an embodiment, the wireless signal 123 (such as a BLE signal) can include a wakeup signal for waking up the personal mobile terminal 200. The personal mobile terminal 200 that detects the wakeup signal can wake up a corresponding application component (such as an automatic elevator call APP) of the personal mobile terminal 200 to work. The wireless signal 123 can further include a data signal reflecting a universally unique identifier (UUID) of the wireless signal apparatus 120 and/or information about a floor position of the wireless signal apparatus 120.

In an embodiment, the strength of the wireless signal 123 attenuates with its propagation distance. Therefore, the personal mobile terminal 200 receiving the wireless signal 123 can roughly determine a current distance D1 between the personal mobile terminal 200 and the wireless signal apparatus 123 according to the signal strength of the wireless signal 123 detected by the personal mobile terminal 200. It will be appreciated that as the passenger walks relative to the elevator landing zone 410 or walks in the elevator landing zone 410, the distance D1 changes dynamically.

Still as shown in FIG. 3, an elevator call request command generating unit 220 is further disposed in the personal mobile terminal 200, and is configured to generate a corresponding elevator call request command 221. The elevator call request command 221 at least includes elevator call direction information, and can further include at least one of destination floor information, elevator call floor information, and target elevator information. The elevator call request command 221 can be sent to the wireless signal apparatus 120 through the short range communication unit 210 of the personal mobile terminal 200, so that the wireless signal apparatus 120 can further transmit the elevator call request command 221 to the elevator controller 140 (for example, when the interaction 320 has been established). The specific form and/or specific generation manner of the elevator call request command 221 is not limited. In an embodiment, all the personal mobile terminals 200 are uniformly assigned with an identity (ID). The ID can be, for example, an APP ID of an automatic elevator call APP. The ID is unique for each personal mobile terminal 200. The elevator call request command 221 sent to the wireless signal apparatus 120 by each personal mobile terminal 200 will include the ID. Therefore, the wireless signal apparatus 120 receiving the elevator call request command 221 can obtain or identify, based on the ID, the personal mobile terminal 200 from which the elevator call request command 221 comes.

In an embodiment, still as shown in FIG. 3, 1231 represents a boundary of a predetermined range which can be covered by the wireless signal 123 broadcast by the wireless signal apparatus 120. When the personal mobile terminal 200 enters the boundary 1231, the personal mobile terminal 200 not only can detect the wireless signal 123, but also can send an elevator call request command 221 to the wireless signal apparatus 120 automatically. The boundary 1231 reflects an elevator call distance, and the personal mobile terminal 200 at or within the boundary 1231 not only can detect the wireless signal 123, but also can send an elevator call request command 221 automatically. In an embodiment, the boundary 1231 corresponds to a position where the signal strength of the wireless signal 123 is basically a trigger threshold strength, and a distance between the boundary 1231 and the wireless signal apparatus 120 corresponds to the elevator call distance. When the passenger 90 carries the personal mobile terminal 200 and enters the boundary 1231, it can be determined that the personal mobile terminal 200 successfully detects the wireless signal 123 of which the signal strength is greater than the trigger threshold strength. The elevator call request command generating unit 220 of the personal mobile terminal 200 automatically generates the corresponding information of the elevator call request command 221 including an ID, establishes an interaction 320 (such as establishes a Bluetooth connection) between the short range communication unit 210 and the wireless signal apparatus 120, and sends the elevator call request command 221 including an ID. In other words, when detecting that the signal strength of the wireless signal 123 is greater than or equal to the corresponding trigger threshold strength, the personal mobile terminal 200 can send the corresponding elevator call request command 221 to the wireless signal apparatus 120 automatically.

Using the application scenario shown in FIG. 2 as an example, when two passengers enter the elevator landing zone 410 (such as a lobby waiting area), the personal mobile terminal 200-1 or 200-2 (such as a mobile phone, regardless of whether the mobile phone is held in hand or put in a handbag) carried by the passengers will automatically detect the wireless signal 123 broadcast by the wireless signal apparatus 120 installed in the elevator landing zone 410 (a distance from the personal mobile terminal 200-1 or 200-2 to the wireless signal apparatus 120 is less than or equal to the elevator call distance). Therefore, the personal mobile terminal 200-1 or 200-2 will establish a handshake connection, such as a Bluetooth connection, with the wireless signal apparatus 120 based on the wireless signal 123. The personal mobile terminal 200-1 or 200-2 automatically sends an elevator call request command at least including elevator call direction information, thus automatically completing an elevator call request operation. The passenger neither needs to manually press an elevator call button installed on an elevator call request input device nor needs to manually operate the personal mobile terminal 200-1 or 200-2.

Therefore, by configuring the automatic elevator call system 20 in the elevator system 10 according to the embodiment of the present invention, the passenger 90 carrying the personal mobile terminal 200 can complete the elevator call request operation automatically or in a hand free manner, which can significantly improve passenger experience in terms of the elevator call operation.

Further, the elevator controller 140 of the elevator system 10 can be coupled to the wireless signal apparatus 120 and can control running of one or more elevator cars 110 in the elevator system 10 in response to at least the elevator call request command. For example, the elevator controller 140 can schedule a corresponding elevator car 110 for the passengers 90-1 and 90-2 and control the elevator car 110 to stop at the landing corresponding to the elevator landing zone 410, allowing the passengers 90-1 and 90-2 to enter the elevator car 110.

It should be noted that the automatic elevator call system 20 in the embodiments shown in FIG. 1 and FIG. 3 generally sends the elevator call request command 221 only once. In other words, the automatic elevator call system 20 sends the elevator call request command 221 automatically only once when the passenger 90 carrying the personal mobile terminal 200 enters the boundary 1231, thus avoiding the generation of redundant abnormal elevator call operations.

However, the applicant finds that the following situations, for example, will cause the generation of abnormal elevator call operations. In a first situation, the passenger 90 walks back and forth on the boundary of 1231 (for example, the passenger 90 is making a phone call) and therefore repeatedly enters the boundary 1231 frequently. This may cause the personal mobile terminal 200 to frequently send the elevator call request command 221, even leading to failure in opening the car door of the stopping elevator car. In a second situation, although the personal mobile terminal 200 can implement an operation-free elevator call function and can also generally be provided with an input section to receive an elevator call request input of the passenger 90, even if the personal mobile terminal 200 has already completed the elevator call request process for the passenger 90 automatically, the passenger 90 may repeatedly input the elevator call request frequently (for example, the passenger 90 is a child and performs a play operation, or the passenger operates maliciously), or the passenger 90 ceaselessly closes and opens the short range communication unit 210 (for example, ceaselessly turns "on" and "off" the Bluetooth) within the boundary 1231, which will also cause the personal mobile terminal 200 to frequently send the elevator call command 221.

To further solve the above problem, in an embodiment, as shown in FIG. 3, a counting unit 230 is disposed in the personal mobile terminal 200. The counting unit 230 is configured to count, after the elevator call request command 221 corresponding to an ID is sent, the number N of times an elevator call request corresponding to the ID is made within a predetermined time period T1. That is, the counting unit 230 counts the number N of times the elevator call request is made within the predetermined time period T1 for each ID. The number of times the elevator call request is made within the predetermined time period T1 can be understood as the number of times the elevator call request is sent.

For example, the predetermined time period T1 starts counting after the automatic elevator call APP sends an elevator call request command 221 once, and can be selectively set to be within 30 seconds to 1 minute. For example, T1=40 seconds. It can be understood that if the predetermined time period T1 is set to be too long, the number of times the elevator call request is made corresponding to too many normal elevator call request operations will be counted easily, and that if the predetermined time period T1 is set to be too short, the number of times the elevator call request is made corresponding to abnormal elevator call request operations cannot be counted effectively.

Counting the number N of times the elevator call request is made can be implemented by counting the number of times the elevator call request command is sent, no matter whether the elevator call request command is generated and sent automatically or is sent by a manual operation. It will be understood that the elevator call request command 221 sent automatically by an automatic elevator call APP corresponding to the timing start point is probably a valid elevator call request, which may not be counted.

An abnormal elevator call request judgment unit 240 is further disposed in the personal mobile terminal 200. The abnormal elevator call request judgment unit 240 judges, based on a comparison result between the counted number N of times the elevator call request is made and a predetermined threshold $N^{th}$, whether the elevator call request corresponding to the ID is a normal elevator call request operation. In an embodiment, when $N \geq N_{th}$, the elevator call request corresponding to the ID within the predetermined time period T1 is determined as an abnormal elevator call request operation; when $N < N_{th}$, the elevator call request corresponding to the ID within the predetermined time period T1 is determined as a normal elevator call request operation.

In an embodiment, $3 \leq N_{th} \leq 10$. For example, the predetermined threshold $N_{th}=5$ or 6. It will be understood that if the predetermined threshold $N^{th}$ is set to be excessively high, some malicious abnormal elevator call request operations may not be judged. If the predetermined threshold $N^{th}$ is set to be too low, a normal elevator call request operation may be easily judged as an abnormal elevator call request operation.

In an embodiment, a sending stop unit 250 is further disposed in the personal mobile terminal 200. The sending stop unit 250 is configured to stop, when the elevator call request corresponding to the ID is determined as an abnormal elevator call request, sending the elevator call request command 221 corresponding to the ID. As such, the personal mobile terminal 200 cannot send the elevator call request command 221 to the wireless signal apparatus 120 within, for example, a time period, thereby preventing abnormal elevator call request operations of the passenger 90 from further affecting the running efficiency of the elevator system 10.

In an application scenario, when the passenger 90 using the automatic elevator call APP of the personal mobile terminal 200 enters the boundary 1231 of the wireless signal 123 of the wireless signal apparatus 120, an elevator call request is automatically triggered, and thus an elevator call request command 221 including the corresponding ID of the passenger 90 or the personal mobile terminal 200 is sent to the wireless signal apparatus 120 once. In this case, the timing begins, and the number N of times the elevator call request is made within the predetermined time period T1 is counted. If the automatic elevator call APP of the personal mobile terminal 200 frequently sends the elevator call request command, the counted number N of times the elevator call request is made will be greater than or equal to the predetermined threshold $N_{th}$, and thus it is judged that the passenger is making a malicious elevator call and the elevator call request within the predetermined time period T1 is determined as an abnormal elevator call request operation. For example, when waiting for the elevator within the boundary 1231, the passenger 90 continuously performs elevator call operations manually as he/she is impatient. Even if the elevator call request command corresponding to the first operation of the continuous manual operations is not counted into the number N of times the elevator call request is made, the subsequent manual operations will be counted and used to judge whether they are abnormal elevator call request operations. When the elevator call operation is continuously performed manually more than $N^{th}$ times, the abnormal elevator call request judgment unit 240 will automatically judge that the passenger 90 is making a malicious elevator call, and the sending stop unit 250 will subsequently stop the elevator call request command of the elevator call operations after being performed $(N_{th}+1)$ times.

Figure 4:
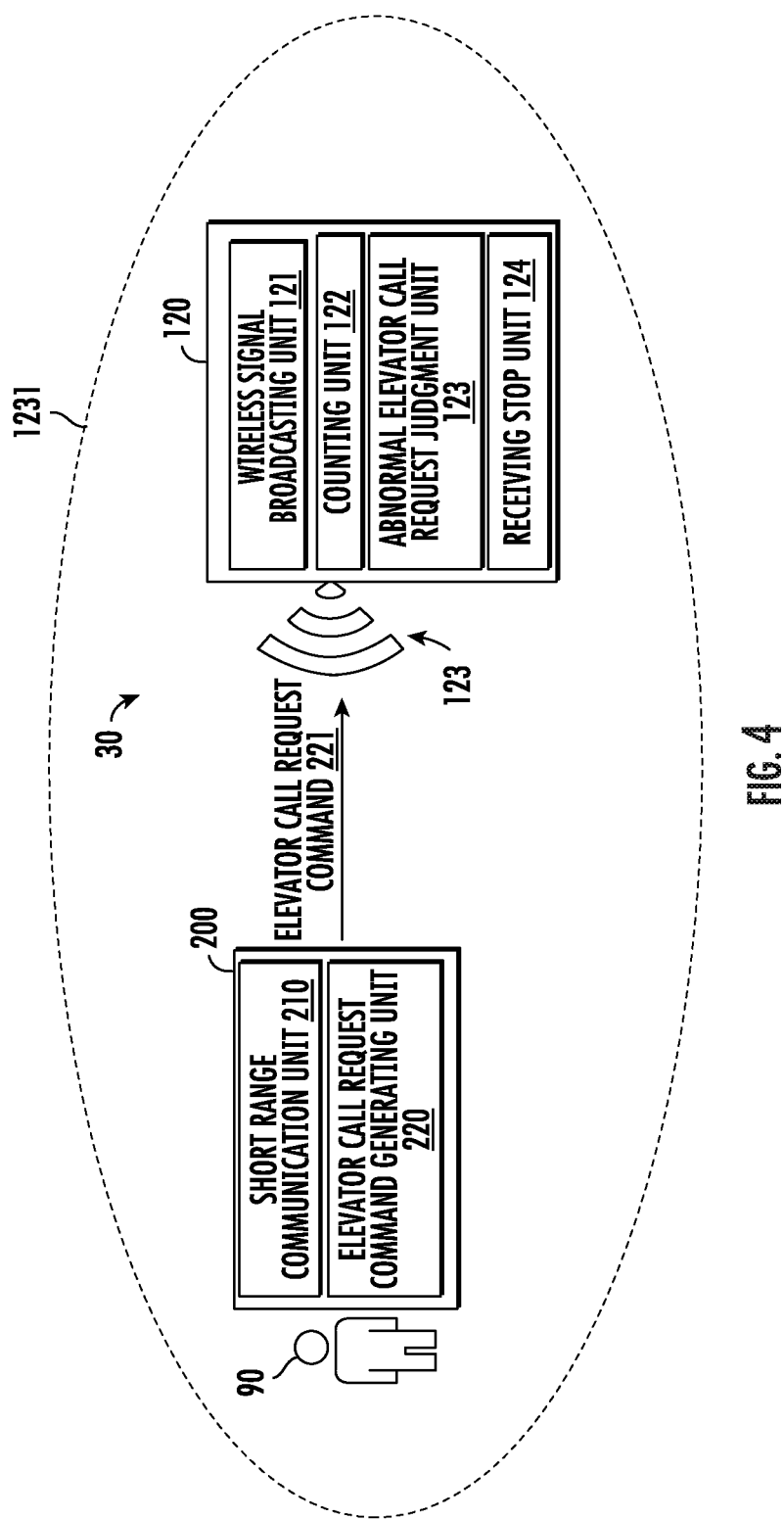
FIG. 4 is a schematic diagram of an automatic elevator call system according to another embodiment of the present invention, in which a wireless signal apparatus according to another embodiment of the present invention is included.

FIG. 4 is a schematic diagram of an automatic elevator call system according to another embodiment of the present invention, in which a wireless signal apparatus according to another embodiment of the present invention is included. The automatic elevator call system 30 has basically the same functions and structures as the automatic elevator call system 20 shown in FIG. 3, and can also be applied to the elevator system 10 in the embodiment shown in FIG. 1. Compared with the automatic elevator call system 20 shown in FIG. 3, the main difference of the automatic elevator call system 30 is that the function of judging an abnormal elevator call request operation is implemented by the wireless signal apparatus 120, but not by the personal mobile terminal 200.

As shown in FIG. 4, a counting unit 122 is disposed in the wireless signal apparatus 120. The counting unit 122 is configured to count, after the elevator call request command 221 corresponding to an ID is received, the number N of times an elevator call request corresponding to the ID is made within a predetermined time period T1. In other words, the counting unit 122 counts the number N of times the elevator call request is made within the predetermined time period T1 for each ID.

For example, the predetermined time period T1 is counted after the automatic elevator call APP receives an elevator call request command 221 corresponding to an ID, which can be selectively set to be within 30 seconds to 1 minute. For example, T1=45 seconds.

Counting the number N of times the elevator call request is made can be implemented by counting the number of times the elevator call request command is received. It will be understood that the received elevator call request command 221 corresponding to the timing start point is probably a valid elevator call request, which may not be counted. The counting unit 121 can parse the received elevator call request command 221 to obtain the ID, so as to implement corresponding counting for each ID.

An abnormal elevator call request judgment unit 123 is further disclosed in the wireless signal apparatus 120. The abnormal elevator call request judgment unit 123 judges, based on a comparison result between the counted number N of times the elevator call request is made and a predetermined threshold $N_{th}$, whether the elevator call request corresponding to the ID is a normal elevator call request operation. In an embodiment, when $N \geq N_{th}$, the elevator call request corresponding to the ID within the predetermined time period T1 is determined as an abnormal elevator call request operation; when $N < N_{th}$, the elevator call request corresponding to the ID within the predetermined time period T1 is determined as a normal elevator call request operation.

In an embodiment, $3 \leq N_{th} \leq 10$. For example, the predetermined threshold $N_{th}=5$ or 6.

In an embodiment, a receiving stop unit 124 is further disposed in the wireless signal apparatus 120. The receiving stop unit 124 is configured to stop, when the elevator call request corresponding to the ID within a predetermined time period T1 is determined as an abnormal elevator call request, receiving the elevator call request 221 corresponding to the ID. As such, the wireless signal apparatus 120 does not receive the elevator call request command 221 sent from the personal mobile terminal 200 corresponding to the ID within, for example, a time period, thereby preventing abnormal elevator call request operations of the passenger 90 from further affecting the running efficiency of the elevator system 10.

In an embodiment, the wireless signal apparatus 120 is further configured to cancel the elevator call request command 221 corresponding to the elevator call request when the elevator call request corresponding to the ID within the time period T1 is determined as an abnormal elevator call request. For example, even if the elevator call request commands 221 have already been sent to the elevator controller 140, the wireless signal apparatus 120 sends a message indicative of cancelling the elevator call request commands 221 to the elevator controller 140. As such, the elevator call request commands 221 which have not been performed will be ignored by the elevator system 10, thereby further improving the running efficiency of the elevator system 10.

In an application scenario, when the passenger 90 using the automatic elevator call APP of the personal mobile terminal 200 enters the boundary 1231 of the wireless signal 123 of the wireless signal apparatus 120, an elevator call request is automatically triggered, and thus the wireless signal apparatus 120 receives an elevator call request command 221 including the corresponding ID of the passenger 90 or the personal mobile terminal 200 once. In this case, the timing begins, and the number N of times the elevator call request is made within the predetermined time period T1 is counted. If the automatic elevator call APP of the personal mobile terminal 200 frequently sends the elevator call request command 221, the number N of times the elevator call request corresponding to the ID is made counted by the wireless signal apparatus 120 will be greater than or equal to the predetermined threshold $N^{th}$. Therefore, it is judged that the passenger 90 is making a malicious elevator call and the elevator call request within the predetermined time period T1 is determined as an abnormal elevator call request command. For example, when waiting for the elevator within the boundary 1231, the passenger 90 continuously performs elevator call operations manually as he/she is impatient. Even if the elevator call request command corresponding to the first operation of the continuous manual operations is not counted into the number N of times the elevator call request is made, the subsequent manual operations will be counted and used to judge whether it is an abnormal elevator call request operation. When the elevator call operation is continuously performed manually more than $N_{th}$ times, the abnormal elevator call request judgment unit 123 will automatically judge that the passenger 90 is making a malicious elevator call, and the receiving stop unit 124 will subsequently stop the elevator call request command of the elevator call operations after being performed ($N_{th}$+1) times. Moreover, the wireless signal apparatus 120 sends a message to the elevator controller 140 to cancel the elevator call request command 221 corresponding to the abnormal elevator call request operation.

The automatic elevator call systems 20 and 30 in the embodiments shown in FIG. 3 and FIG. 4 both can judge the abnormal elevator call request operations of the passenger 90 accurately, especially continuous abnormal elevator call request operations (no matter whether the passenger 90 intentionally or unintentionally performs the abnormal elevator call request operations). Furthermore, the automatic elevator call systems 20 and 30 are both helpful to prevent the abnormal elevator call request operation of the passenger 90, thereby improving the running efficiency of the elevator system 10.

It will be understood that the automatic elevator call systems 20 and 30 in the embodiments shown in FIG. 3 and FIG. 4 can be applied in combination. For example, the personal mobile terminal 200 in the embodiment shown in FIG. 3 as well as the wireless signal apparatus 120 in the embodiment shown in FIG. 4 are used in an automatic elevator call system.

Figure 5:
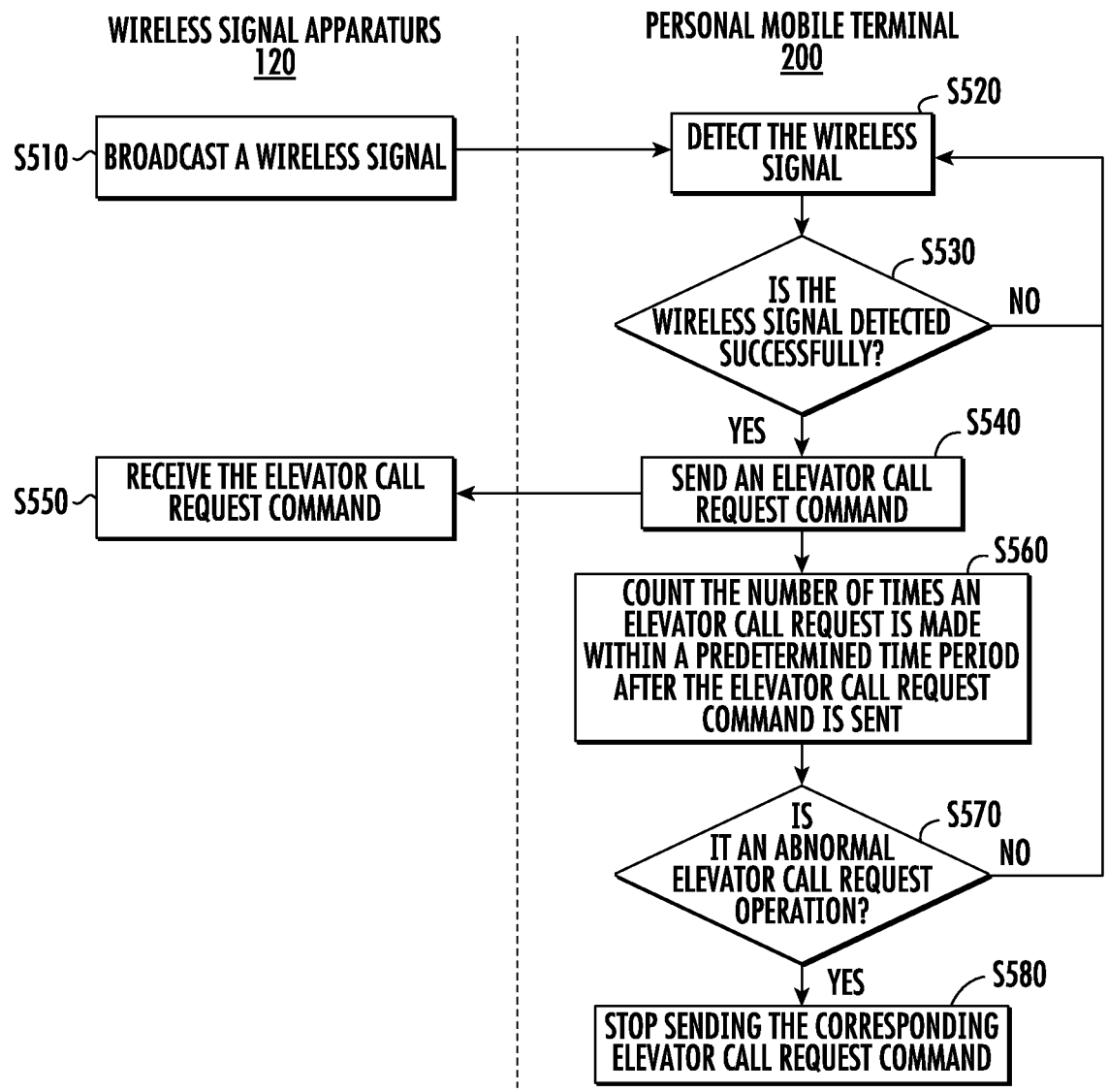
FIG. 5 is a flowchart of a method for determining an abnormal elevator call request of an automatic elevator call system according to an embodiment of the present invention.

FIG. 5 is a flowchart of a method for determining an abnormal elevator call request of an automatic elevator call system according to an embodiment of the present invention. The method for determining an abnormal elevator call request in the embodiment shown in FIG. 5 is performed in the automatic elevator call system 20 shown in FIG. 3 correspondingly. The method for determining an abnormal elevator call request in the embodiment is described in detail with reference to FIG. 3 and FIG. 5.

On the side of the wireless signal apparatus 120, as shown in FIG. 5, in step 510, the wireless signal apparatus 120 can continuously broadcast the wireless signal 123 for example. On the side of the personal mobile terminal 200, once entering the coverage of the wireless signal 123, the personal mobile terminal 200 carried by the passenger 90 can detect the wireless signal 123, i.e., step S520.

Further, in step S530, it is judged whether the wireless signal 123 is detected successfully. In an embodiment, it is judged based on the trigger threshold strength whether the wireless signal 123 is detected successfully. For example, if the signal strength of the detected wireless signal 123 is greater than or equal to the trigger threshold strength, the corresponding passenger 90 reaches the boundary 1231 (as shown in FIG. 3), the judgment result is "yes", and an elevator call request command is automatically triggered and generated and the elevator call request command 221 is sent to the wireless signal apparatus 120, i.e., step S540; otherwise, the judgment result is "no", and step S520 is performed.

Correspondingly, the side of the wireless signal apparatus 120 receives the elevator call request command 221, i.e., step S550. As such, one elevator call request operation process is completed automatically.

Further, the number N of times elevator call request corresponding to the ID of the personal mobile terminal 200 is made is counted within a predetermined time period T1 after the elevator call request command 221 is sent, i.e., step S560. For example, the number of times the elevator call request command 221 sent continuously by the personal mobile terminal 200 is counted within 45 S (T1=45 S) each time the elevator call request command 221 is sent.

Further, in step S570, it is judged whether it is a normal elevator call request operation. In this step, it is judged based on a comparison result between the counted number N of times the elevator call request is made and a predetermined threshold $N_{th}$ whether the elevator call request corresponding to the ID is a normal elevator call request operation. In an embodiment, when $N \geq N_{th}$, the judgment result is "yes", that is, the elevator call request corresponding to the ID within the predetermined time period T1 is determined as an abnormal elevator call request operation; when $N < N_{th}$, the judgment result is "no", that is, the elevator call request corresponding to the ID within the predetermined time period T1 is determined as a normal elevator call request operation, and step S520 is performed.

In an embodiment, step S580 is performed when the judgment result in step S570 is "yes", the personal mobile terminal 200 stops sending the elevator call request command 221 corresponding to the ID. As such, the personal mobile terminal 200 cannot send the elevator call request command 221 to the wireless signal apparatus 120 within, for example, a time period, thereby preventing abnormal elevator call request operations of the passenger 90 from further affecting the running efficiency of the elevator system 10.

Figure 6:
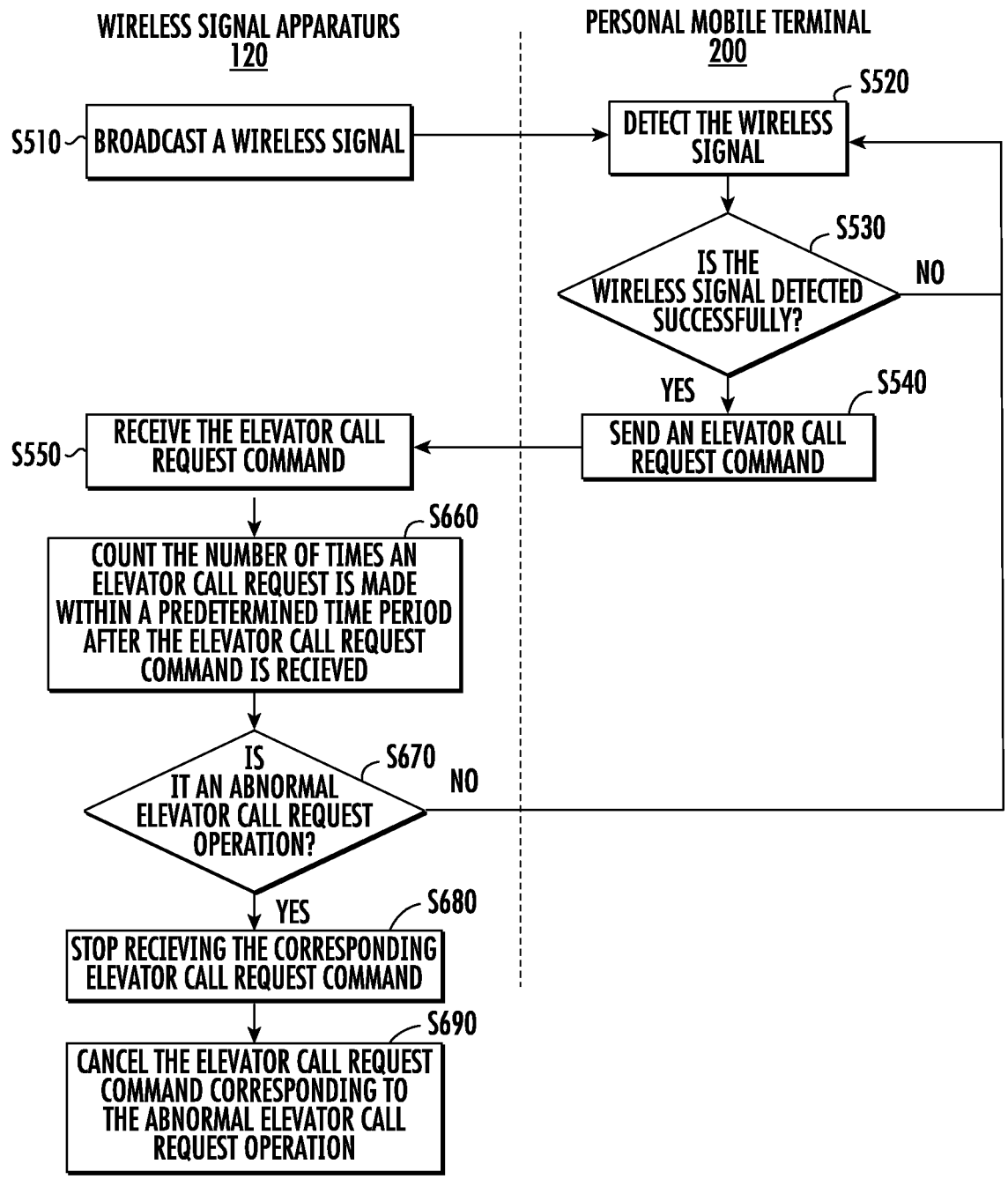
FIG. 6 is a flowchart of a method for determining an abnormal elevator call request of an automatic elevator call system according to another embodiment of the present invention.

FIG. 6 is a flowchart of a method for determining an abnormal elevator call request of an automatic elevator call system according to another embodiment of the present invention. The method for determining an abnormal elevator call request in the embodiment shown in FIG. 6 is performed in the automatic elevator call system 30 in the embodiment shown in FIG. 4 correspondingly. The method for determining an abnormal elevator call request in the embodiment is described in detail with reference to FIG. 4 and FIG. 6.

As shown in FIG. 6, step S510 to step S550 are basically the same as step S510 to step S550 of the embodiment shown in FIG. 5, and thus the descriptions about the steps are omitted. It should be pointed out that in the embodiment shown in FIG. 6, in step S540, the elevator call request command 221 including the ID corresponding to the personal mobile terminal 200 is sent, in step S550, the wireless signal apparatus 120 can parse the received elevator call request command 221 to obtain the ID. Therefore, the personal mobile terminal 200 from which the elevator call request command 221 comes is obtained.

On the side of the wireless signal apparatus 120, step S660 is further performed, i.e., after the elevator call request command 221 corresponding to an ID is received, the number N of times the elevator call request corresponding to the ID is counted within a predetermined time period T1. For example, each time the elevator call request command 221 of an ID is received, the number of times the elevator call request command 221 of the ID received continuously within 45 S (T1=45 S) is counted.

Further, in step S670, it is judged whether it is an abnormal elevator call request operation. In this step, it is judged based on a comparison result between the counted number N of times the elevator call request is made and a predetermined threshold $N_{th}$ whether the elevator call request corresponding to the ID is a normal elevator call request operation. In an embodiment, when $N \geq N_{th}$, the judgment result is "yes", that is, the elevator call request corresponding to the ID within the predetermined time period T1 is determined as an abnormal elevator call request operation; when $N < N_{th}$, the judgment result is "no", that is, the elevator call request corresponding to the ID within the predetermined time period T1 is determined as a normal elevator call request operation, and step S520 is performed.

In an embodiment, step S680 is performed when the judgment result in step S670 is "yes", that is, the wireless signal apparatus 120 stops receiving the elevator call request command 221 corresponding to the ID (for example, gives up the elevator call request command 221 of the ID). As such, the elevator call request command 221 sent by the personal mobile terminal 200 within, for example, a time period, will be ignored by the wireless signal apparatus 120, thereby preventing abnormal elevator call request operations of the passenger 90 from further affecting the running efficiency of the elevator system 10.

In an embodiment, step S690 is further included, i.e., when the elevator call requests corresponding to the ID within the predetermined time period T1 are determined as abnormal elevator call request operations, the elevator call request commands 221 corresponding to the abnormal elevator call requests are cancelled. For example, even if the elevator call request commands 221 have already been sent to the elevator controller 140, the wireless signal apparatus 120 can send the message indicative of cancelling these elevator call request commands 221 to the elevator controller 140. As such, the elevator call request commands 221 which have not been performed will be ignored by the elevator system 10, which is conducive to further improving the running efficiency of the elevator system 10.

It will be understood that steps S660 to S690 can be performed for each personal mobile terminal 200.

Therefore, the method for determining an abnormal elevator call request in the above embodiments of the present invention can accurately determine an abnormal elevator call request operation (especially continuous abnormal elevator call request operations), and reduce negative effects of these abnormal elevator call request operations on running of the elevator system 10.

It should be noted that the personal mobile terminal 200 in the above embodiment of the present invention can be implemented by using computer program instructions, e.g., implemented by a specific APP. These computer program instructions can be provided to a processor of a general-purpose computer, a special-purpose computer, or another programmable data processing device to form the personal mobile terminal 200 in the embodiment of the present invention. Moreover, the processor of the computer or another programmable data processing device can execute these instructions to create units or components for implementing functions/operations designated in these flowcharts and/or blocks and/or one or more of the flowchart blocks.

Similarly, the wireless signal apparatus 120 of the elevator system 10 in the above embodiment of the present invention can be implemented by using computer program instructions, e.g., implemented by a specific program. These computer program instructions can be provided to a processor to form the control module 300 in the embodiment of the present invention. Moreover, the instructions that can be executed by a processor of a computer or another programmable data processing device are used to create units or components for implementing functions/operations designated in these flowcharts and/or blocks and/or one or more of the flowchart blocks.

Moreover, these computer program instructions can be stored in a computer readable memory. These instructions can instruct the computer or another programmable processor to implement the functions in specific manners, such that these instructions stored in the computer readable memory construct a product including instruction components for implementing functions/operations specified in one or more blocks of the flowcharts and/or block diagrams.

It should be further noted that in some alternative implementations, the functions/operations shown in the blocks may not take place according to the sequence shown in the flowchart. For example, two blocks shown sequentially may be performed substantially at the same time, or these blocks sometimes may be performed in a reversed order, which specifically depends on the functions/operations involved.

It should be noted that elements (including the flowcharts and block diagrams in the accompanying drawings) disclosed and depicted in this specification refer to logic boundaries between elements. However, according to software or hardware engineering practices, the depicted elements and functions thereof can be executed on a machine by using a computer executable medium. The computer executable medium has a processor that can execute a program instruction stored thereon. The program instruction serves as a single-chip software structure, an independent software module, or a module using an external program, code, service or the like, or any combination thereof. Moreover, all these execution solutions may fall within the scope of the present disclosure.

Although different non-limitative implementation solutions have components that are specifically illustrated, the implementation solutions of the present invention are not limited to these specific combinations. Some of the components or features from any non-limitative implementation solution may be combined with features or components from any other non-limitative implementation solution.

Although specific step sequences are shown, disclosed and required, it should be understood that the steps may be implemented in any sequence, separated, or combined, and they will still benefit from the present disclosure unless otherwise specified.

The foregoing descriptions are exemplary and are not defined to be limitative. Various non-limitative implementation solutions are disclosed in this specification; however, according to the foregoing teaching, those of ordinary skill in the art will be aware that various modifications and variations will fall within the scope of the appended claims. Therefore, it should be understood that disclosure content other than those specifically disclosed can be implemented within the scope of the appended claims. Therefore, the appended claims should be read up to determine the real scope and content.

What is claimed is:

1. An automatic elevator call system, comprising:
a wireless signal apparatus installed in an elevator landing zone of an elevator system and broadcasting a corresponding wireless signal around;
wherein the automatic elevator call system detects the wireless signal through a personal mobile terminal, and is capable of sending an elevator call request to the wireless signal apparatus automatically; and
the automatic elevator call system further comprises:
a counting unit configured to count, after an elevator call request corresponding to an identity of the personal mobile terminal is sent or received, the number of times the elevator call request corresponding to the identity is made within a predetermined time period; and
an abnormal elevator call request judgment unit configured to judge, based on a comparison result between the number of times the elevator call request is made and a predetermined threshold, whether the elevator call request corresponding to the identity is a normal elevator call request operation.

2. The automatic elevator call system according to claim 1, wherein the abnormal elevator call request judgment unit is further configured to determine the elevator call request corresponding to the identity as an abnormal elevator call request operation when the number of times the elevator call request is made is greater than or equal to the predetermined threshold, and to determine the elevator call request corresponding to the identity as a normal elevator call request operation when the number of times the elevator call request is made is less than the predetermined threshold.

3. The automatic elevator call system according to claim 1, wherein the predetermined time period is 30 seconds to 1 minute.

4. The automatic elevator call system according to claim 1, wherein the predetermined threshold is greater than or equal to 3 times and less than or equal to 10 times.

5. The automatic elevator call system according to claim 1, wherein the counting unit and the abnormal elevator call request judgment unit are disposed in the personal mobile terminal.

6. The automatic elevator call system according to claim 5, wherein the automatic elevator call system further stops, through a sending stop unit in the personal mobile terminal, sending the elevator call request corresponding to the identity when the elevator call request corresponding to the identity is determined as an abnormal elevator call request.

7. The automatic elevator call system according to claim 1, wherein the counting unit and the abnormal elevator call request judgment unit are disposed in the wireless signal apparatus.

8. The automatic elevator call system according to claim 7, wherein the wireless signal apparatus is further provided with a receiving stop unit configured to stop receiving the elevator call request corresponding to the identity when the elevator call request corresponding to the identity is determined as an abnormal elevator call request.

9. The automatic elevator call system according to claim 7, wherein the wireless signal apparatus is further configured to cancel the elevator call request when the elevator call request corresponding to the identity is determined as an abnormal elevator call request.

10. The automatic elevator call system according to claim 7, wherein the automatic elevator call system further sends an elevator call request comprising a corresponding identity to the wireless signal apparatus automatically through the personal mobile terminal.

11. The automatic elevator call system according to claim 1, wherein the elevator call request can be implemented by a manual operation of a passenger carrying the personal mobile terminal.

12. The automatic elevator call system according to claim 1, wherein the wireless signal apparatus is a Bluetooth module/Bluetooth Low Energy (BLE) module, and the wireless signal is a Bluetooth signal/BLE signal.

13. A method for determining an abnormal elevator call request of an automatic elevator call system, comprising steps of:
counting, after an elevator call request corresponding to an identity of a personal mobile terminal is sent or received, the number of times the elevator call request corresponding to the identity is made within a predetermined time period; and
judging, based on a comparison result between the number of times the elevator call request is made and a predetermined threshold, whether the elevator call request corresponding to the identity is a normal elevator call request operation;
wherein in the judging step, the elevator call request corresponding to the identity is determined as an abnormal elevator call request operation if the number of times the elevator call request is made is greater than or equal to the predetermined threshold, and
the elevator call request corresponding to the identity is determined as a normal elevator call request operation if the number of times the elevator call request is made is less than the predetermined threshold.

14. The method according to claim 13, wherein the predetermined time period is 30 seconds to 1 minute.

15. The method according to claim 13, wherein the predetermined threshold is greater than or equal to 3 times and less than or equal to 10 times.

16. The method according to claim 13, further comprising a step of:
stopping sending or receiving the elevator call request corresponding to the identity when the elevator call request corresponding to the identity is determined as an abnormal elevator call request operation.

17. The method according to claim 16, further comprising a step of:
cancelling the elevator call request when the elevator call request corresponding to the identity is determined as an abnormal elevator call request operation.

18. The method according to claim 16, further comprising a step of: sending an elevator call request comprising a corresponding identity to the wireless signal apparatus automatically.

19. The method according to claim 13, further comprising steps of:

broadcasting a corresponding wireless signal through a wireless signal apparatus installed in an elevator landing zone of an elevator system; and detecting the wireless signal through a personal mobile terminal and sending an elevator call request to the wireless signal apparatus automatically.

20. A wireless signal apparatus, wherein the wireless signal apparatus is installed in an elevator landing zone of an elevator system and broadcasts a corresponding wireless signal around, and is capable of receiving, based on the wireless signal, an elevator call request from a personal mobile terminal that detects the wireless signal; wherein the wireless signal apparatus comprises:

a counting unit configured to count, after an elevator call request corresponding to an identity of a personal mobile terminal is received, the number of times the elevator call request corresponding to the identity is made within a predetermined time period; and an abnormal elevator call request judgment unit configured to judge, based on a comparison result between the number of times the elevator call request is made and a predetermined threshold, whether the elevator call request corresponding to the identity is a normal elevator call request operation.

21. The wireless signal apparatus according to claim 20, wherein the abnormal elevator call request judgment unit is further configured to: determine the elevator call request corresponding to the identity as an abnormal elevator call request operation when the number of times the elevator call request is made is greater than or equal to the predetermined threshold, and to determine the elevator call request corresponding to the identity as a normal elevator call request operation when the number of times the elevator call request is made is less than the predetermined threshold.

22. The wireless signal apparatus according to claim 20, wherein the predetermined time period is 30 seconds to 1 minute.

23. The wireless signal apparatus according to claim 20, wherein the predetermined threshold is greater than or equal to 3 times and less than or equal to 10 times.

24. The wireless signal apparatus according to claim 20, further comprising:

a receiving stop unit configured to stop receiving the elevator call request corresponding to the identity when the elevator call request corresponding to the identity is determined as an abnormal elevator call request.

25. The wireless signal apparatus according to claim 20, wherein the wireless signal apparatus is further configured to cancel the elevator call request corresponding to the identity when the elevator call request is determined as an abnormal elevator call request.

26. The wireless signal apparatus according to claim 20, wherein the wireless signal apparatus is a Bluetooth module/Bluetooth Low Energy (BLE) module, and the wireless signal is a Bluetooth signal/BLE signal.

27. A wireless signal apparatus, comprising a memory, a processor, and a computer program that is stored in the memory and can be run on the processor, wherein when executing the program, the processor implements the following steps of:

broadcasting a corresponding wireless signal;

receiving an elevator call request comprising an identity;

counting, after the elevator call request corresponding to the identity is received, the number of times the elevator call request corresponding to the identity is made within a predetermined time period; and judging, based on a comparison result between the number of times the elevator call request is made and a predetermined threshold, whether the elevator call request corresponding to the identity is a normal elevator call request operation.

28. A non-transitory computer readable storage medium, storing a computer program, wherein the program is executed by a processor to perform the steps of the method for determining an abnormal elevator call request according to claim 13.

29. An elevator system, comprising:

the automatic elevator call system according to claim 1; and an elevator controller configured to control running of one or more elevator cars in the elevator system;

wherein the elevator controller is coupled to the wireless signal apparatus and controls the running of the one or more elevator cars in the elevator system in response to at least the elevator call request.

* * * * *